(12) United States Patent
Hotaling

(10) Patent No.: US 9,030,303 B2
(45) Date of Patent: May 12, 2015

(54) CONTACTLESS SENSING AND CONTROL SYSTEM

(76) Inventor: William Jay Hotaling, Haddonfield, NJ (US)

( * ) Notice: Subject to any disclaimer, the term of this patent is extended or adjusted under 35 U.S.C. 154(b) by 83 days.

(21) Appl. No.: 13/435,988

(22) Filed: Mar. 30, 2012

(65) Prior Publication Data

US 2012/0249310 A1 Oct. 4, 2012

Related U.S. Application Data

(60) Provisional application No. 61/469,390, filed on Mar. 30, 2011.

(51) Int. Cl.
*G08C 19/12* (2006.01)
*G08C 17/02* (2006.01)
*G01S 5/08* (2006.01)
*G08C 23/04* (2006.01)

(52) U.S. Cl.
CPC . *G08C 17/02* (2013.01); *G01S 5/08* (2013.01); *G08C 23/04* (2013.01)

(58) Field of Classification Search
USPC ........................................ 340/13.24, 825, 8.1
See application file for complete search history.

(56) References Cited

U.S. PATENT DOCUMENTS

| | | | |
|---|---|---|---|
| 6,130,663 A | 10/2000 | Null | |
| 7,725,288 B2 | 5/2010 | Boillot | |
| 7,834,847 B2 * | 11/2010 | Boillot et al. | 345/156 |
| 8,106,749 B2 | 1/2012 | Ina et al. | |
| 2005/0088416 A1 * | 4/2005 | Hollingsworth | 345/173 |
| 2008/0034331 A1 * | 2/2008 | Josephsoon et al. | 715/863 |
| 2008/0048878 A1 * | 2/2008 | Boillot | 340/686.1 |
| 2008/0059915 A1 | 3/2008 | Boillot | |
| 2008/0256494 A1 | 10/2008 | Greenfield | |
| 2010/0007511 A1 * | 1/2010 | Ina et al. | 340/825 |
| 2010/0253532 A1 * | 10/2010 | Pernisek et al. | 340/825 |
| 2010/0289740 A1 | 11/2010 | Kim et al. | |
| 2011/0063224 A1 * | 3/2011 | Vexo et al. | 345/168 |
| 2012/0075072 A1 * | 3/2012 | Pappu | 340/10.1 |

* cited by examiner

*Primary Examiner* — Firmin Backer
*Assistant Examiner* — Adnan Aziz
(74) *Attorney, Agent, or Firm* — Paul Frank + Collins PC

(57) ABSTRACT

This disclosure describes embodiments of a contactless sensing system for controlling operation of a remote device. The sensing system can comprise an actuator and a sensing device, which is responsive to a field the actuator emits. An end user can move the actuator relative to the sensing device to generate an output that reflects a device command that modifies operation of the remote device. In one example, the sensing device comprises an array of sensing elements. The field causes a change in operating parameters in the sensing elements, which the sensing device can identify and associate with the device command. The sensing device can also recognize combinations of one or more of the sensing elements that exhibit changes in the operating parameters to provide a robust control mechanism for the remote device.

20 Claims, 6 Drawing Sheets

CONTACTLESS SENSING AND CONTROL SYSTEM

RELATED APPLICATIONS

This application claims the benefit of priority to U.S. Provisional Patent Application Ser. No. 61/469,390, entitled "Contactless Sensing and Control System," the content of which is incorporated in its entirety herein.

BACKGROUND

1. Technical Field

The subject matter disclosed herein relates to user interfaces and, more particularly, to embodiments of a user interface to control peripheral devices without line-of-sight and/or contact by an end user.

2. Description of Related Art

Conventional implements are known to control the operation of remote devices, e.g., televisions, radios, garage doors, etc. These implements often embody a handheld controller, which an end user points in the direction of the remote device. During operation, the end user manipulates an actuatable button or toggle that causes the implement to emit a signal to operate a unique control on the remote device. Examples of these controls can include on/off, open/close, channel selection, brightness control, and other functions that relate to the specific device-under-operation. This feature offers convenience, enabling the end user to control the functions of the remote device without the need for direct contact.

Many of these implements require physical interaction, e.g., between the end user and the actuatable button. However, in certain environments, such as hospitals or anywhere where germs or contamination is a concern, it is not desirable or possible for the end user to physically handle the remote control. In other environments, the end user may need to wear protective clothing that prohibits actuation or, in other examples, limits movement of the end user to such a degree so as to prevent proper dexterity and preciseness of movement to use the actuatable buttons.

The discussion above is merely provided for general background information and is not intended to be used as an aid in determining the scope of the claimed subject matter.

SUMMARY

This disclosure describes embodiments of a contactless sensing system for controlling operation of a remote device. The contactless sensing system can comprise an actuator and a sensing device, which is responsive to a field the actuator emits. An end user can move the actuator relative to the sensing device to generate an output that reflects a device command that modifies operation of the remote device. In one example, the sensing device comprises an array of sensing elements. The field causes a change in operating parameters in the sensing elements, which the sensing device can identify and associate with the device command. The sensing device can also recognize combinations of one or more of the sensing elements that exhibit changes in the operating parameters to provide a robust control mechanism for the remote device.

The disclosure describes, in one embodiment, a control system for a remote device. The control system comprises an actuator that emits a field and a sensing device responsive to the field. The sensing device comprises a plurality of sensing elements having operating parameters that change in response to the presence of the field. In one example, the sensing device generates an output signal that reflects a change in the operating parameters that defines a device command to operate the remote device.

The disclosure also describes, in one embodiment, a sensing device comprises an array of sensing elements having operating parameters that change in response to a field. The sensing device also comprises a control circuit coupled to the array, the control circuit comprising a processor, a memory coupled to the processor, and one or more executable instructions stored on the memory and configured to be executed by the processor. The executable instructions comprising instructions for receiving a signal pattern from the array of sensing elements, matching the signal pattern to a device command, and generating an output signal that reflects the device command The disclosure further describes, in one embodiment, a method for controlling a remote device. The method comprises receiving signals reflecting a change in an operating parameter in one or more sensing elements, the change occurring in response to movement of a field over the sensing elements. The method also comprises identifying a signal pattern from the received signals and selecting a device command associated with the signal pattern. The method further comprises generating an output that reflects the device command.

This brief description of the invention is intended only to provide a brief overview of the subject matter disclosed herein according to one or more illustrative embodiments, and does not serve as a guide to interpreting the claims or to define or limit the scope of the invention, which is defined only by the appended claims. This brief description is provided to introduce an illustrative selection of concepts in a simplified form that are further described below in the detailed description. This brief description is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of the invention. In the drawings, like numerals are used to indicate like parts throughout the various views. Thus, for further understanding of the invention, reference can be made to the following detailed description, read in connection with the drawings in which.

DETAILED DESCRIPTION

Broadly, the discussion below highlights embodiments of a contactless control system that allow an end user to issue commands to control one or more remote devices, e.g., media players including MP3 players, digital video recorders, stereo equipment, communication devices including cellular phones and smartphones, computing devices including computers, laptops, tablets, and gaming systems, radio-controlled systems, audio systems, walkie-talkie units, lighting systems, TV remote control systems, location detection units, and the like. These embodiments translate movement that the end user initiates into device commands, which cause the remote devices to perform or operate in the manner desired by the end user. These systems do not, however, require positive input from the end user, i.e., in the form of contact, voice command, visual or line-of-sight communication, or other input to generate the device commands the end user desires. This feature enables the end user to command and control operation of the remote device while the system (or a portion thereof) is hidden from view or otherwise obscured, e.g., under clothing, material, and the like.

In one aspect, embodiments of the contactless control system are particularly useful for protecting the sensing and control portion of the system and the corresponding remote device(s) in harsh or unsuitable environments. For example, contactless control systems as proposed herein permit implementation in industrial applications in which the end user must wear protective gear (e.g., gloves) that would hinder actuation of certain controls and features on the remote device. The features of the contactless control system, however, permit the end user to operate the remote device, while maintaining the requisite level of protection and, further, continuing to perform tasks without delay, e.g., to move to a safer environment to remove protective gear to operate the remote device. In other aspects, these embodiments find use in medical applications, e.g., to control medical devices and equipment for use in hospitals, nursing home, home care and related home-based care and diagnostics, machinery, areas where extreme sanitation is desired, and equipment for use in emergency response. In still other aspects, these embodiments find use in housing and commercial applications, e.g., to control lighting systems to forgo use of visible switch/dimmer, to control thermostats and temperature control systems, to adjust lighting brightness levels, etc. Embodiments of the systems herein may also have application as a tool for theater/performance where the user may wish to hide a control interface from the viewer.

Figure 1:
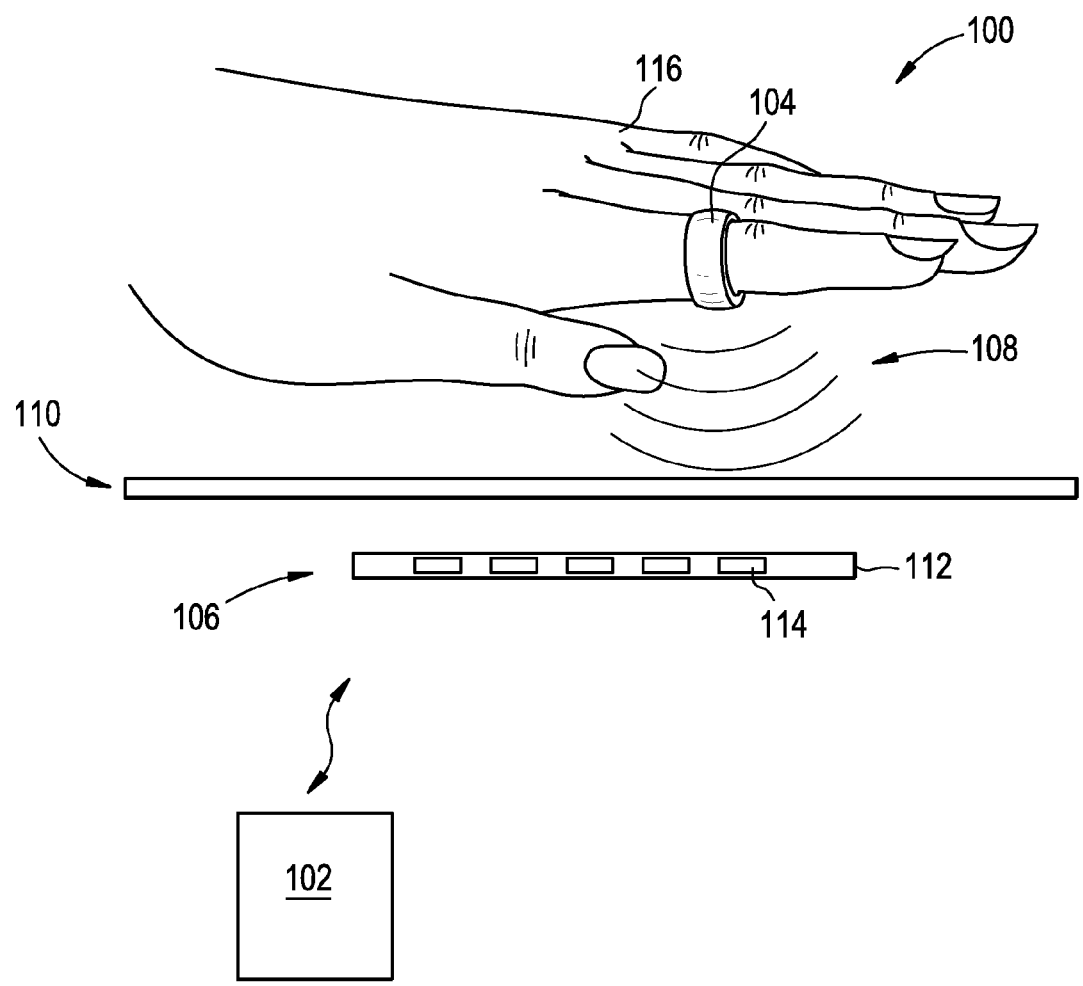
FIG. 1 depicts an exemplary contactless sensing system.

FIG. 1 illustrates an example of a contactless control system 100 (also "system 100") that can operate a remote device 102. The system 100 includes an actuator 104 and a sensing device 106 that couples with the remote device 102. In one embodiment, the actuator 104 can emit (and/or broadcast) a field 108 that can penetrate through an object 110. Examples of the object 110 can include fabric and clothing materials, as well as any materials that obscure the light of sight between the actuator 104 and the sensing device 106.

The sensing device 106 includes a body 112 that supports one or more sensing elements 114 with operating parameters that change in response to the field 108. As discussed more below, an end user 116 can manipulate the position of the actuator 104 relative to the sensing device 106 to change the operating parameters. The system 100 (e.g., via the sensing device 106 and/or one or more accompanying elements) can recognize the change in the operating parameters and, in one construction, can associate the changes that occur in one or more of the sensing elements 114 with an output appropriate to execute a device command at the remote device 102. Examples of the device commands correspond to operations and/or features of the remote device 102, e.g., on/off, volume controls, screen display controls, and the like.

The actuator 104 can have a form factor that is conducive to operation and manipulation by the end user 110. The form factor can, for example, comprise a ring (as shown in FIG. 1) or other hollow device, e.g., that can fit onto the finger and/or hand of the end user 108. Other form factors may take the form of a glove, bracelet, or ankle bracelet. The form factor can also embody a separate device, e.g., an object that the end user 108 can hold or grasp or which can fit in, on, and/or around the extremities of the end user 108. Exemplary devices can include a remote control, cell phone, cell phone case, and the like. In one example, the form factor of actuator 104 may comprise a small device that can affix to (or under) the skin of the end user 116.

The field 108 can embody various forms, e.g., magnetic fields, radio frequencies, wireless communication protocols, and like forms that can penetrate the object 110. To communicate with the sensing device 106, the actuator 104 can comprise a device (or transmitter) that emits, or causes the actuator to emit, these types of the field 108. Exemplary devices include magnets (e.g., permanent magnets and electromagnets), as well as radio-frequency identification (RFID) devices, and other wireless devices using known wireless protocols (e.g., near field communication (NFC)). Configurations of these transmitter can transmit the field 108 continuously, e.g., through the use of a permanent magnet. In other examples, use of powered devices (e.g., electromagnets) permit the field 108 to change, e.g., on and off, as well as to adjust the strength of the field 108 as desired. Selection of the device may correspond to features (e.g., sensitivity) of the sensing device 106 and responsiveness to the field 108. For example, magnets that emit stronger magnetic fields relative to the magnetic field of other magnets may increase the range at which changes in the operating parameters of the sensing elements 114 will occur. The relatively stronger magnetic fields may better penetrate the object 110 and, more particularly, penetrate materials to an extent that increases or varies the amount and thickness of material to be penetrated should it come between the actuator 104 and the sensing device 106.

Examples of the sensing elements 114 can comprise one or more transducers (e.g., Hall Effect sensors) or switches (e.g., Reed switches) that are sensitive to the field 108. In one example, the sensing elements 114 exhibit an operating parameter (e.g., an output voltage) that varies in response to changes in the strength of the field 108. When the field 108 is a magnetic field, Hall Effect sensors are effective to detect both transverse motion of the actuator 104 relative to the sensing elements 114 as well as approximate closeness, or distance, between the actuator 104 and the surface of the sensing element 114. In one example, the output voltage of the sensing element 114 changes in response to changes in the strength of the magnetic field.

In one embodiment, the sensing elements 114 can exhibit a polarity sensitivity, wherein the sensing element 114 is sensitive to one or both poles of a magnetic field or other characteristics of the field 108 (e.g., different radio frequency). Examples of the sensing device 106 can comprise Hall Effect sensors sensitive to both poles of a magnet, known as omni-polar sensors, which enable versatile and high likelihood of activation. In other examples, the sensing device 106 can comprise uni-polar Hall Effect sensors. This configuration of the sensing device 106 could be used if the opposite pole, from that being required for activation, is present in the environment, or if differentiation between two activation units is desired.

In one example, the sensing device 106 can comprise a plurality of paired Hall Effect sensors, wherein adjacent Hall-Effect sensors respond to opposite magnetic poles. The actuator 104 may comprise a multiplicity of devices that emit fields that correspond to the different magnetic poles. The multiplicity of devices can be worn by the same end user (e.g., on different hands and/or fingers) and/or by two different end users. Examples of the sensing device 106 that are equipped in this manner, however, would be able to discern which of the devices, and which of the different end users, that originate the field 108, thereby providing a robust design to discern between different commands at the same time.

The sensing system 100 and the remote device 102 can exchange signals, which include the output signal from the sensing device 106 to convey device commands. Coupling of the exchanged signals can occur using wired and/or wireless protocols and using a standardized instruction protocol (e.g., Bluetooth® or universal serial bus (USB)). These standardized protocols enable prompt (and automated) recognition of the sensor system 100 by the remote device 102 using existing hardware, firmware, and embedded executable instructions (e.g., drivers). For implementations that do not use standard protocols, the system 100 may include a corresponding antenna or wired-in de-coder to properly instruct the remote device 102 and provide an appropriate handshake to establish communication with the system 100. Examples of wireless connections are common to computing devices (e.g., laptops, tablets), mobile phones (e.g., so-called smartphones), MP3 players, iPods®, etc., Internet devices (e.g., wireless routers), infrared and other communications to control televisions, digital video players, digital video records, set-top boxes, as well as other proprietary radio waves and connection modalities.

The body 112 can comprise materials that permit deformation and conformation of general form. Exemplary materials can comprise plastics and composites, as well as fabrics and other malleable materials. These materials can be extruded and molded to conform to many different shapes and sizes and to incorporate and protect the sensing elements 114. The size and shape of the body 112 can vary to accommodate the application of the sensing system 100. As shown in FIG. 1, the body 112 can comprise a thin and/or elongated member. Other configurations may take any form which might provide adequate storage of the sensing device 106, while maintaining sufficient exposure of the sensing elements 114 to the field 108.

Figure 2:
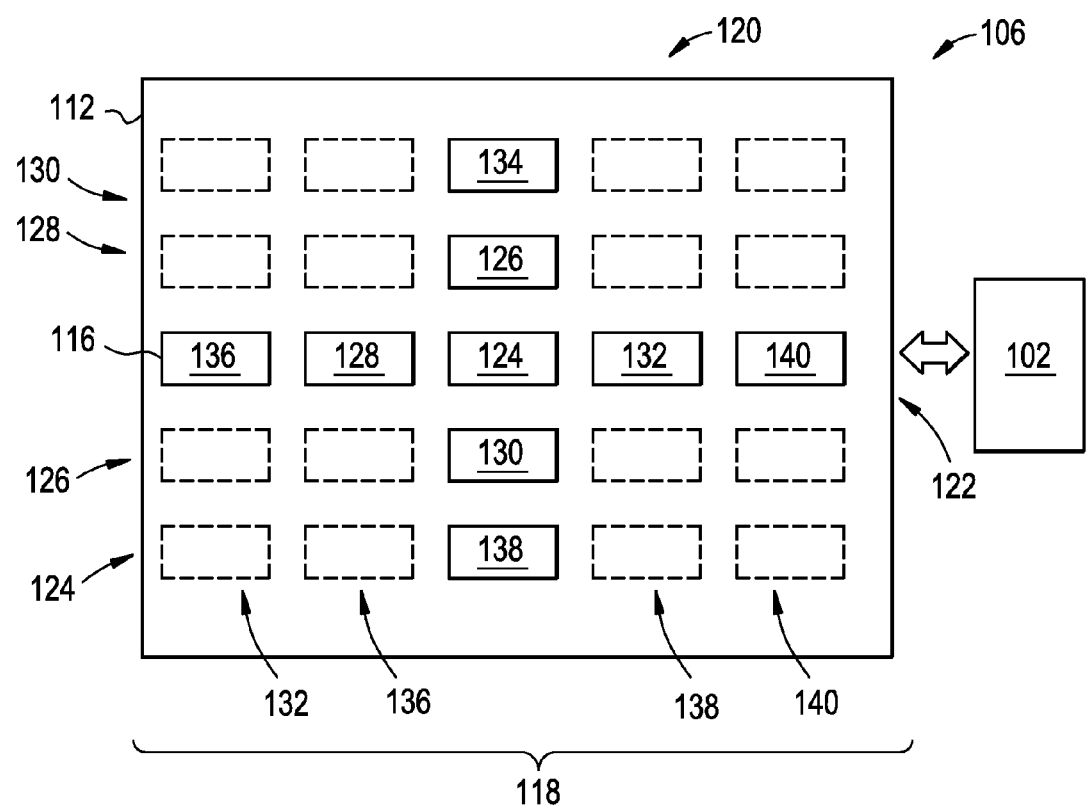
FIG. 2 depicts an example of a sensing device for use in the contactless sensing system of FIG. 1.

FIG. 2 illustrates a top view of the sensing device 106 of FIG. 1. The sensing device 106 includes an array 118 of sensing elements 114. The pattern of the sensing elements 114 in the array 118 can vary and can adapt to the particular application and/or implementation as desired. In the example of FIG. 2, the array 118 comprises a cross-pattern with a horizontal axis 120 and a vertical axis 122. This pattern includes sensing elements 124, 126, 128, 130, 132, 134, 136, 138, 140. Other examples of the pattern can form a grid that include additional rows (e.g., rows 124, 126, 128, 130) and columns (e.g., columns 132, 134, 136, 140). In still other examples, the sensing elements 114 can form a target or bullseye pattern, wherein the sensing elements 114 reside on concentric circles of varying diameter. In further examples, the pattern can form one or more parallel axis (e.g., columns 136, 138 and/or rows 126, 128), single lines (e.g., any one of the rows 124, 126, 128, 130 and/or any one of the columns 132, 134, 136, 140), as well as other shapes (e.g., triangular, elliptical, hexagon, etc.) as desired.

During operation, the actuator (e.g., actuator 104 of FIG. 1) can move relative to sensing elements 114 of the array 118. This movement embodies user input commands, which define the device commands the system outputs to the remote device. This disclosure contemplates a wide variety of different user input commands. The user input commands can actuate the sensing elements 114 in a specific pattern (also, "a signal pattern"). The signal pattern can include one or more of the sensing elements 114, actuated in different combinations and orders to reflect certain device commands the end user wishes to convey to the remote device.

Examples of user input commands include swipe commands (wherein the actuator traverses one or more of the sensing element 114), hold commands (wherein the actuator maintains position over one or more of the sensing elements 114 for an input time period), and non-linear movement commands (wherein the actuator traverses one or more of the sensing elements 114 in a non-linear fashion).

The scope and type of user input commands can vary in accordance with the pattern (e.g., the cross-pattern, the grid pattern, the target pattern, etc.) of the sensing elements 114 as well as in connection with the output commands. Moreover, use of sensing elements 114 that can monitor the relative distance of the actuator away from the sensing device provides additional defining characteristics for the user input commands. For example, the sensing system can associate the relative distance of the actuator from the sensing device 106 with directionality (or other movement) of the actuator relative to the sensing elements 114 to identify device commands. This feature can enable different user input commands based on the relative distance, or elevation, of the actuator from the sensing device 106 in combination with the directionality. For example, the end user could perform the same user input command at different elevations to achieve different device commands.

Swipe commands include movement of the actuator across the sensing device 106, e.g., along one or both of the vertical axis 120 and the horizontal axis 122. The movement can start at the outermost sensing elements (e.g., the sensing element 134, 136, 138, 140) and move in the direction along the appropriate axis. The direction the actuator moves relative to the array 118 can result in device commands that are different from one another. For example, a swipe command from the sensing element 136 to sensing element 140 can result in a first device command and a swipe command from the sensing element 140 to the sensing element 136 can result in a second device command. In other examples, swipe commands may involve circular motion or curvilinear motion of the actuator relative to the array 118. This motion can likewise result in unique device commands.

In one implementation, embodiments of the sensing system can determine the direction of travel of the actuator using only a few of the sensing elements 114 of the array 118. For example, if the swipe command traverses the vertical axis 120, the sensing system could recognize the swipe command based on changes in all of the sensing elements 114 in that axis (e.g., sensing elements 124, 126, 130, 134, 138) or only a subset of the sensing elements 114 in that axis (e.g., the sensing element 134 and 138). This feature may ensure correct execution and selection of the device commands and facilitate operation by requiring less precise operation and position of the actuator with respect to the sensing elements 114 of the sensing device 106. Moreover, the system may require that the actuator engage at least a minimum number of sensing elements 114, depending on the implementation of the system, to increase or decrease the likelihood that a very poorly controlled swipe command results in the correct device command. To decrease the likelihood of a mistaken input, the system may require that at least one of the sensing elements 114 at the far ends (e.g., the sensing element 134 and 138) of the vertical axis 120 or that the middle sensing element 124 changes operating parameters on every swipe command.

Exemplary hold commands can activate the sensing elements 114 for a prescribed period of time. In one example, individual ones of the sensing elements 114 in the array 118 may be assigned certain device commands that, if the operating parameters change for a defined time period or prescribed input time period, the sensing system will generate an output respecting that device command. The length of time could be infinite or scalable based on the differences in desired output. For example, holding the actuator over the sensing element 124 for a first prescribed input time could implement a first device command, holding the actuator over the sensing element 136 for a second prescribed input time period could implement a second device command, and holding the actuator over the sensing element 134 could implement a third device command.

Figure 3:
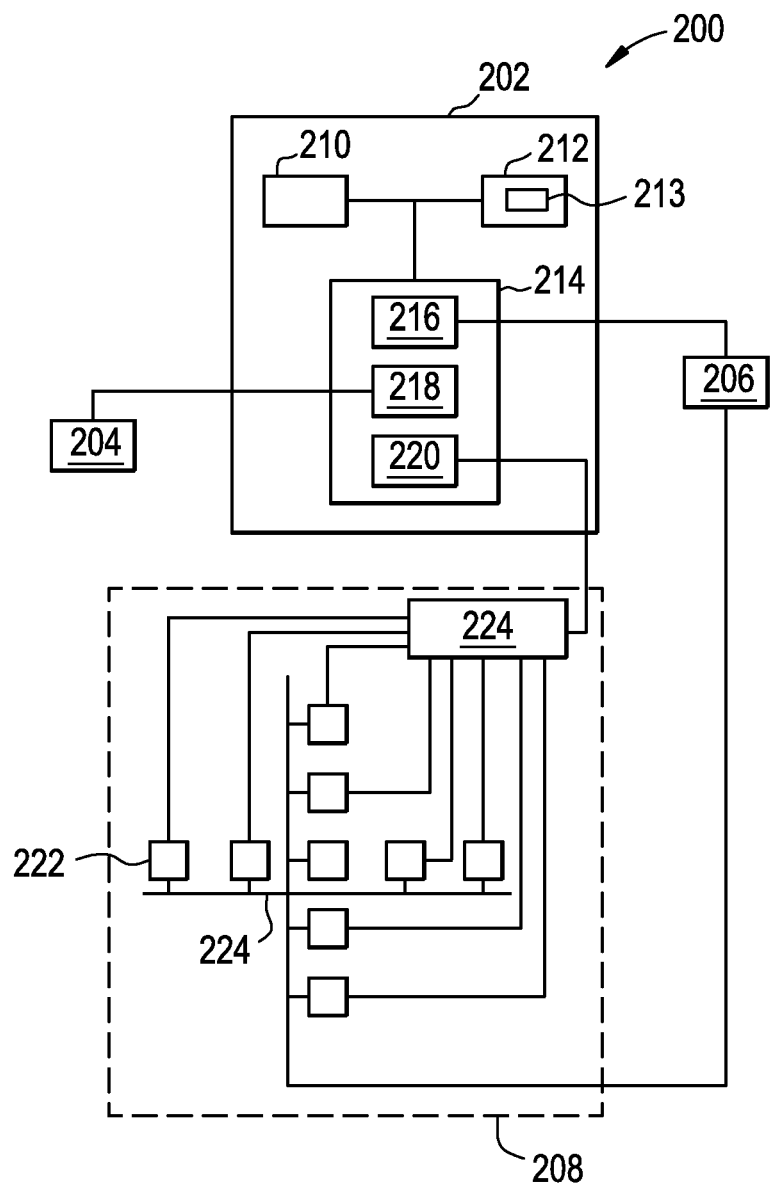
FIG. 3 depicts a high-level wiring schematic of an example of a sensing device for use in the contactless sensing system of FIG. 1.

FIG. 3 illustrates a high-level wiring schematic for an exemplary sensing device 200 for use as sensing device 106 in FIGS. 1 and 2. Generally the schematic illustrates one of a variety of configurations to implement the concepts of the present disclosure. These configurations can utilize various components (e.g., resistors, capacitors, switches, diodes, etc.) that are useful and can embody the design and implementation of the contactless system, e.g., to permit control and translation of movement of the actuator to command devices. This disclosure also contemplates other configurations of components that would form topologies that can embody the scope and spirit of the schematic of FIG. 3 as well as other schematics not shown the figures.

In the example of FIG. 3, the sensing device 200 includes a control circuit 202 that couples with an communication device 204, a power supply 206, and an array 208 of sensing elements. The control circuit 202 has a processor 210, memory 212 with one or more executable instruction 213, and a drive circuit 214 with a power supply drive circuit 216, a communication device drive circuit 218, and a sensing device drive circuit 220. The array 208 comprises a plurality of sensing elements 222 with a power bus 224 coupling one or more of the sensing elements 222 with the power supply 206 and to ground. As shown in FIG. 3, the sensing elements 222 couple with a communication port 226, which couples with the sensing element drive circuit 220 to permit the exchange of signals therebetween. In other embodiments, the sensing elements 222 may couple directly with the sensing device drive circuit 220, and/or the control circuit 202, to facilitate communication of signals.

The processor 210 can execute high-level logic functions, algorithms, as well as executable instructions, e.g., in the form of firmware and software. Examples of these functions and algorithms are provided in connection with FIGS. 4, 5, and 6 discussed below. The steps of the methods 300, 400, and 500 can be provided as executable instructions, which the components of the sensing device 200 can execute to implement and, ultimately, generate the inputs and outputs disclosed herein.

In one example, the processor 210 comprises a central processing unit (CPU) such as an ASIC and/or an FPGA. The processor 210 can also include state machine circuitry or other suitable components capable of receiving inputs from the control circuit 202 and/or directly from the sensing elements 220 and/or other components (e.g., remote device 102 112 of FIG. 1). The memory 212 comprises volatile and non-volatile memory and can be used for storage of software (or firmware) instructions and configuration settings. In some embodiments, the processor 210, the memory 212, and the drive circuit 202 can be contained in a single integrated circuit (IC) or other component. In another example, the processor 210 can include internal program memory such as RAM and/or ROM. Similarly, any one or more of these functions of these components can be distributed across additional components (e.g., multiple processors or other components).

Figure 4:
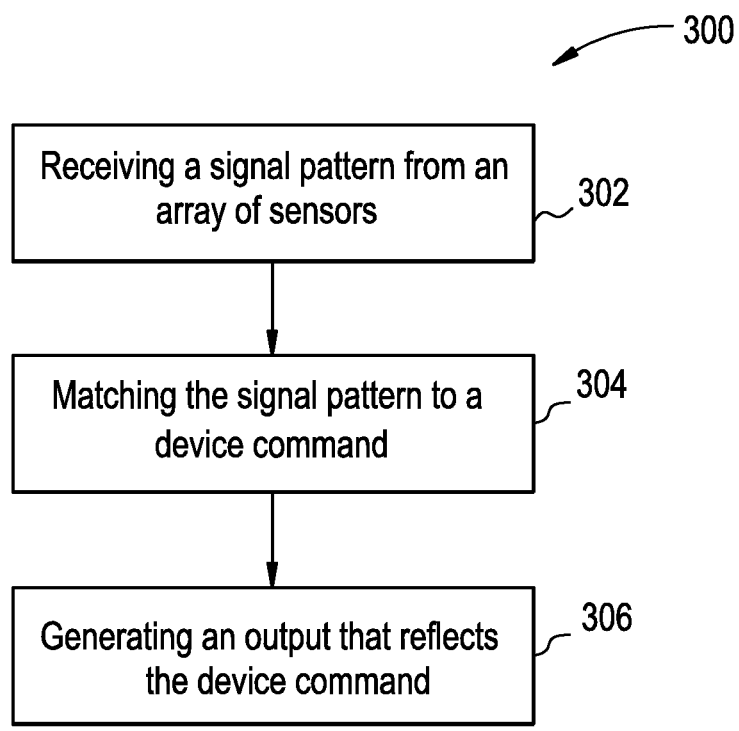
FIG. 4 depicts a flow diagram of a method for controlling a remote device.
Figure 5:
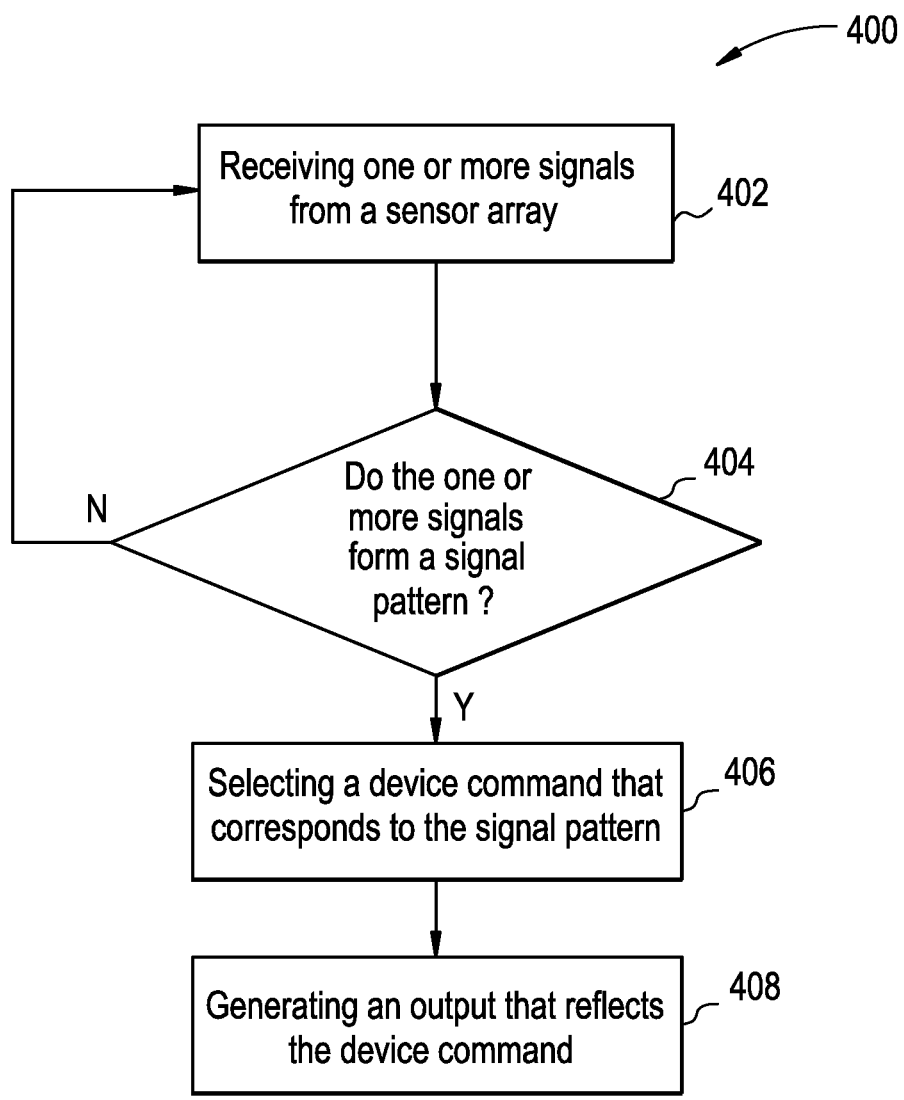
FIG. 5 depicts a flow diagram of another method for controlling a remote device.
Figure 6:
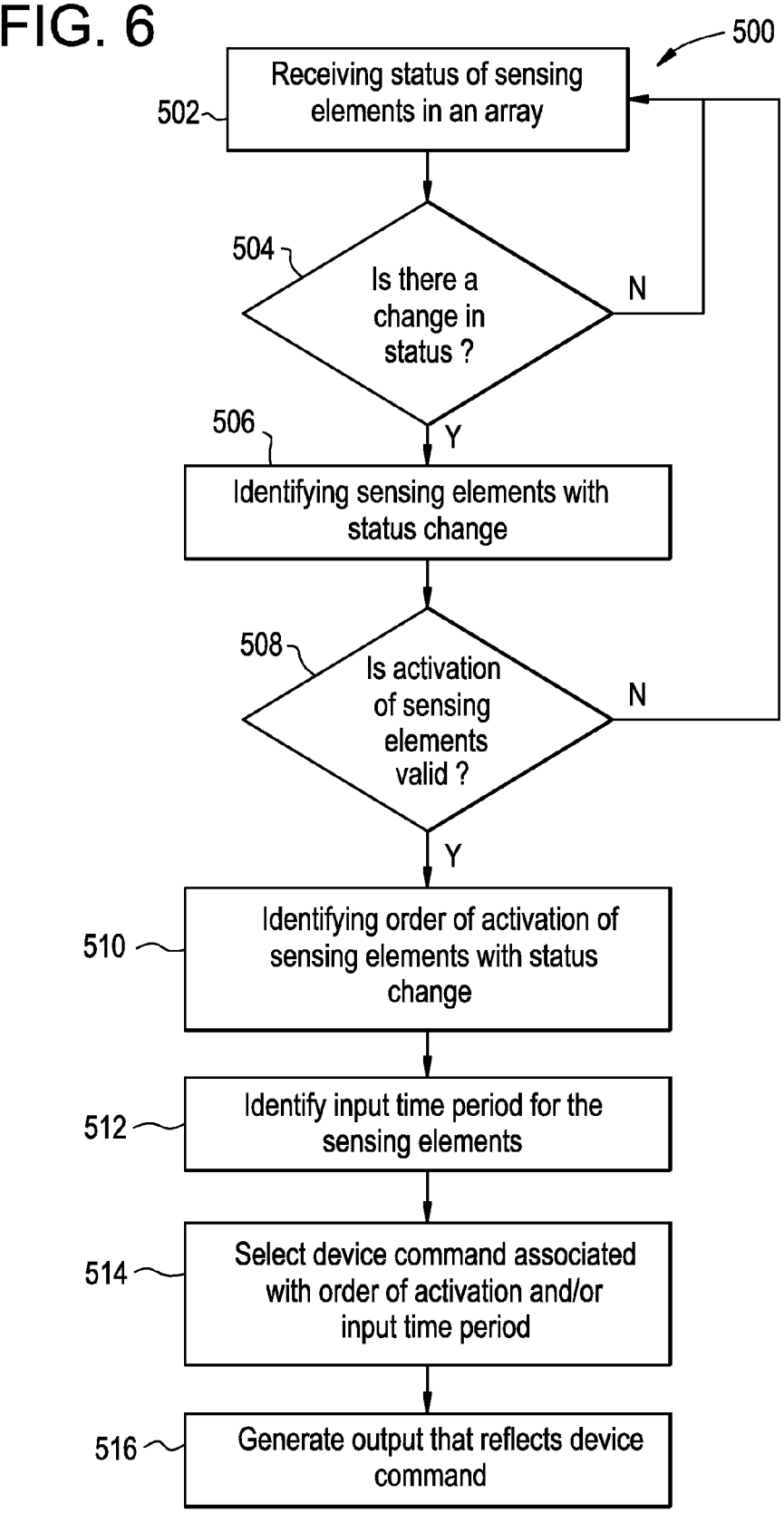
FIG. 6 depicts a flow diagram of yet another method for controlling a remote device.

FIGS. 4, 5, and 6 illustrate flow diagrams of various methods that define operation of a remote device. The steps of the method can be coded or otherwise embodied in one or more executable instructions, which can be stored on memory (e.g., memory 212 of FIG. 3) and executed by a processor (e.g., processor 210 of FIG. 3). The executable instructions can form various software programs (e.g., software, firmware, etc.) that, when executed, can cause the sensing system to generate outputs that define device commands.

In FIG. 4, the method 300 includes, at block 302, receiving a signal pattern from an array of sensing elements. The method 300 also includes, at block 304, matching the signal pattern to a device command and, at block 306, generating an output that reflect the device command. The output can comprise an electrical signal that is compatible with the remote device that couples with the contactless control system. This signal can change the operation of the remote device, e.g., by inducing a voltage or current that activates and/or deactivates a switch in the remote device.

Examples of the signal pattern can reflect the order, or other operating characteristics, that illustrates a change in state of one or more of the sensing elements in the array. In one example, a signal pattern can include a first signal from one sensing element (e.g., sensing element 136 of FIG. 2) and a second signal from another sensing element (e.g., sensing element 128 of FIG. 2). The combination of the first signal and the second signal may form an identified signal pattern that, in one example, has a device command (e.g., reduce volume) associated therewith. Other types of operating characteristics that can make up the signal pattern can include the input time period, specific combinations of sensing elements in the array (e.g., activation of adjacent sensing elements), and the like.

FIG. 5 shows a method 400 that includes, at block 402, receiving one or more signals from an array of sensing elements. The method 400 also includes, at block 404, determining whether the signals form a signal pattern. If the signals do not form a signal pattern, then the method 400 awaits signals, e.g., at block 402. On the other hand, if the signals do form a signal pattern, then the method 400 continues, at block 406, selecting a device command that corresponds to the signal pattern and, at block 408, generating an output that reflects the device command.

FIG. 6 depicts a flow diagram for a method 500 that includes, at block 502, receiving a status of a sensing element in an array and, at block 504, determining whether a change has occurred in the status. Exemplary changes can include, for example, a change in output voltage, e.g., from a high level to a low level, and vice versa. If there is no change or, in other examples, the change does not meet a desired threshold level, the method returns to its waiting status (e.g., at block 502). If a change in the status is determined, the method continues, at block 506, identifying the sensing elements that exhibit the change in status. This step of the method 500 can include, for example, detecting the change in output voltage and associating the change to one or more of the sensing elements in the array. The detected sensing elements may form a pattern, e.g., a signal pattern discussed above, or other type of indication that an end user is initiating an end user input command to modify operation of a remote device.

The method 500 also includes, at block 508, determining if the activation of sensing elements (i.e., reflected by the change in status) is valid. In one example, the change in status may be inaccurate and/or may be inadvertent and, thus, does not require further processing to modify operation of the remote device. For example, the change in output voltage may not meet a necessary threshold level to prompt further processing. In other examples, the resulting signal pattern and/or combination of sensing elements may not meet certain criteria to warrant further operation nor modification in the operation of the remote device. If the activation is valid, the method 500 continues, at block 510, identifying an order of activation of sensing elements that exhibit the status change and, at block 512, identifying an input time period for the sensing elements that exhibit the status change. The method 500 can complete the steps (e.g., at block 512) separately and/or in combination along with one or more other identifying steps.

In one embodiment, the method 500 also includes, at block 514, selecting a device command associated with the order of activation and/or input time period. The method 500 further includes, at block 516, generating an output that reflect the device command. This selection may utilize a look-up table or other database in which device commands are listed along with the corresponding input from the sensing elements. The look-up table may likewise include information about certain signal patterns, which indicate and/or define the requisite device command.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "service," "circuit," "circuitry," "module," and/or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code and/or executable instructions embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As used herein, an element or function recited in the singular and proceeded with the word "a" or "an" should be understood as not excluding plural said elements or functions, unless such exclusion is explicitly recited. Furthermore, references to "one embodiment" of the claimed invention should not be interpreted as excluding the existence of additional embodiments that also incorporate the recited features.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A control system for a remote device, said control system comprising:
   an actuator that is configured to emit a field; and
   a sensing device that is configured to be responsive to the field, the sensing device comprising a plurality of sensing elements comprising a first sensing element and a second sensing element, each of the same type and having an operating parameter that changes between a default state and a non-default state in response to the presence of the field,
   wherein the sensing device is configured to identify a signal pattern that reflects a direction of movement of the actuator to change the operating parameter of the first sensing element and then to change the operating parameter of the second sensing element with the actuator in spaced relation to the sensing device,
   wherein the sensing device is configured to generate an output signal in response to the signal pattern,
   wherein the output signal defines a device command that is configured to operate the remote device,
   wherein the device command is associated with the direction of movement of the actuator as defined by an order in which the first sensing element and the second sensing element are activated, and
   wherein the order is indicated in the signal pattern by a first signal from the first sensing element that corresponds with a change in the operating parameter of the first sensing element from the default state to the non-default state with the operating parameter of the second sensing element in the default state followed by a second signal from the second sensing element that corresponds with a change in the operating parameter of the second sensing element from the default state to the non-default state.

2. The control system of claim 1, wherein the field comprises a magnetic field.

3. The control system of claim 1, wherein the actuator comprises a magnet.

4. The control system of claim 1, wherein the field comprises a wireless signal.

5. The control system of claim 1, wherein the first sensing element and the second sensing element comprise a Hall-Effect sensor.

6. The control system of claim 1, wherein the plurality of sensing elements comprises a Reed switch.

7. The control system of claim 1, wherein the plurality of sensing elements forms a cross-pattern.

8. The control system of claim 1, wherein the plurality of sensing elements forms a grid pattern.

9. The control system of claim 1, wherein the sensing device communicates the output signal wirelessly to the remote device.

10. The control system of claim 1, wherein the operating parameter comprises output voltage.

11. The control system of claim 10, wherein one of the default state and the non-default state correspond with a low voltage and one of the default state and the non-default state correspond with a high voltage.

12. A sensing device, comprising:
    a plurality of sensing elements comprising a first sensing element and a second sensing element, each of the same type and having an operating parameter that is configured to change between a default state and a non-default state in response to a field from an actuator; and
    a control circuit coupled to the plurality of sensing elements, the control circuit comprising a processor, a memory coupled to the processor, and one or more executable instructions stored on the memory and configured to be executed by the processor, the executable instructions comprising instructions for,
       receiving one or more signals from the plurality of sensing elements,
       identifying a signal pattern from the received signals, the signal pattern reflecting a direction of movement of the field to the first sensing element and then to the second sensing element with the actuator in spaced relation to the sensing device,
       matching the signal pattern to a device command, and
       generating an output signal in response to the signal pattern that reflects the device command,
    wherein the device command is associated with the direction of movement of the actuator as defined by an order in which the first sensing element and the second sensing element are activated, and
    wherein the order is indicated in the signal pattern by a first signal from the first sensing element that corresponds with a change in the operating parameter of the first sensing element from the default state to the non-default state with the operating parameter of the second sensing element in the default state followed by a second signal from the second sensing element that corresponds with a change in the operating parameter of the second sensing element from the default state to the non-default state.

13. The sensing device of claim 12, further comprising executable instructions for identifying the direction of travel of the field relative to the first sensing element and the second sensing element, and associating the direction of travel with the device command.

14. The sensing device of claim 12, further comprising executable instructions for monitoring an input time period that defines the length of time the operating parameters change between the default state and the non-default state in response to the field, and associating the input time period with the device command.

15. The sensing device of claim 12, wherein the operating parameter comprises output voltage, and wherein one of the default state and the non-default state correspond with a low voltage and one of the default state and the non-default state correspond with a high voltage.

16. A method for controlling a remote device, said method comprising:
    receiving signals from a plurality of sensing elements comprising a first sensing element and a second sensing element, each of the same type, the signals reflecting a change in an operating parameter between a default state and a non-default state on the first sensing element and a change in the operating parameter on the second sensing element between the default state and the non-default state, the changes on the first sensing element and the second sensing element occurring in response to movement of a field from an actuator that is disposed over the first sensing element and then over the second sensing element;
    identifying a signal pattern from the received signals reflecting a direction of movement of the field to change the operating parameter of the first sensing element and then to change the operating parameter of the second sensing element with the actuator in spaced relation to the sensing device;

selecting a device command associated with the signal pattern; and generating an output in response to the signal pattern that reflects the device command, wherein the device command is associated with the direction of movement of the field as defined by an order in which the first sensing element and the second sensing element are activated, and wherein the order is indicated in the signal pattern by a first signal from the first sensing element that corresponds with the change in the operating parameter of the first sensing element from the default state to the non-default state with the operating parameter of the second sensing element in the default state followed by a second signal from the second sensing element that corresponds with the change in the operating parameter of the second sensing element from the default state to the non-default state.

17. The method of claim 16, further comprising identifying an input time period for one or more of the signals, wherein the input time period defines the device command.

18. The method of claim 16, wherein the device commands are listed in a look-up table.

19. The method of claim 16, wherein the field comprises a magnetic field.

20. The method of claim 16, wherein the first sensing element and the second sensing element comprise Hall Effect sensors.

* * * * *